United States Patent [19]
Dreyer et al.

[11] Patent Number: 5,717,383
[45] Date of Patent: Feb. 10, 1998

[54] DEVICE FOR DETERMINING AND/OR MONITORING A PREDETERMINED LEVEL OF CONTENTS IN A CONTAINER

[75] Inventors: Volker Dreyer, Lörrach; Arthur Schrock, Steinen; Martin Pfändler, Maulburg, all of Germany

[73] Assignee: Endress + Hauser GmbH + Co., Maulburg, Germany

[21] Appl. No.: 244,171

[22] PCT Filed: Sep. 21, 1993

[86] PCT No.: PCT/EP93/02557

§ 371 Date: Jul. 18, 1994

§ 102(e) Date: Jul. 18, 1994

[87] PCT Pub. No.: WO94/08215

PCT Pub. Date: Apr. 14, 1994

[30] Foreign Application Priority Data

Sep. 29, 1992 [DE] Germany ............... 42 32 659.1

[51] Int. Cl.⁶ ........................................... G08B 21/00
[52] U.S. Cl. ............... 340/621; 340/618; 340/620; 73/290 V; 73/290 R; 310/318; 310/319
[58] Field of Search ..................... 340/618, 621, 340/620; 73/290 V, 290 R; 310/318, 319, 338

[56] References Cited

U.S. PATENT DOCUMENTS

| | | | |
|---|---|---|---|
| 2,927,301 | 3/1960 | Booth et al. | 340/621 |
| 3,625,058 | 12/1971 | Endress et al. | 73/290 V |
| 4,540,981 | 9/1985 | Lapetina et al. | 340/618 |
| 4,594,584 | 6/1986 | Pfeiffer et al. | 73/290 V |
| 4,594,891 | 6/1986 | Benz et al. | 73/290 V |
| 4,864,856 | 9/1989 | Ichikawa et al. | 73/290 V |
| 5,060,484 | 10/1991 | Bush et al. | 340/621 |
| 5,155,472 | 10/1992 | Dam | 340/621 |
| 5,191,316 | 3/1993 | Dreyor | 340/621 |
| 5,264,831 | 11/1993 | Pfeiffer | 340/621 |
| 5,400,376 | 3/1995 | Trudeau | 340/621 |
| 5,408,168 | 4/1995 | Pfandler | 340/621 |

FOREIGN PATENT DOCUMENTS 0 212 045  3/1987  European Pat. Off. .

OTHER PUBLICATIONS

PCT/EP93/02557 Search Report, Jun. 1, 1994.

Primary Examiner—Jeffery Hofsass
Assistant Examiner—Ashok Mannava
Attorney, Agent, or Firm—Bose McKinney & Evans

[57] ABSTRACT

The device for determining and/or monitoring a predetermined level of contents in a container comprises a sensor, which is so mounted on the container at the level of contents to be monitored that it comes into contact with the contents of the container when the same reach the predetermined level. The sensor is excited to mechanical vibrations at its natural resonant frequency by an exciting arrangement. An evaluating circuit serves for causing indicating and/or switching operations in a manner dependent on whether the frequency of the mechanical vibrations of the sensor is higher or lower than a switching frequency. Associated with the sensor is an electrical circuit element which has a characteristic parameter, whose value bears an unambiguous relationship to the natural resonant frequency of the sensor. In the evaluating circuit the switching frequency is set in accordance with the value of the characteristic parameter of the electrical circuit element. As a result the evaluating circuit adapts itself automatically to sensors with different natural resonant frequencies. The electrical circuit element is preferably a resistor whose resistance represents the said characteristic parameter.

5 Claims, 4 Drawing Sheets

DEVICE FOR DETERMINING AND/OR MONITORING A PREDETERMINED LEVEL OF CONTENTS IN A CONTAINER

The invention relates to a device for determining and/or monitoring a predetermined level of contents in a container, comprising a sensor which is so arranged on the container at the contents level to be monitored that it comes into contact with the contents when the same reach the predetermined level, an exciting arrangement which excites the sensor to mechanical vibrations at its natural resonant frequency, and an evaluating circuit for causing indicating and/or switching operations dependent on whether the frequency of the mechanical vibrations of the sensor is above or below a switching frequency.

A device of this type is for example disclosed in the German patent specification 3,336,991. In the case of this known device the sensor possesses two oscillating rods, which are mounted at a distance apart on a diaphragm and are caused to perform opposite vibrations transversely in relation to their longitudinal direction. However devices of this type have also been suggested in the case of which the sensor comprises only a single oscillating rod or, according to another design, are made entirely without oscillating rods. In all cases the manner of functioning of the device is based on the principle that the natural resonant frequency of the sensor changes when the sensor comes into contact with the contents of the container. When the sensor is covered with the contents, its natural resonant frequency is lower than when the sensor is clear of the contents. The switching frequency is so selected that it is between the lower natural resonant frequency with the sensor covered and the higher natural resonant frequency when the sensor is cleared. When the evaluating circuit determines that the frequency of oscillation of the sensor is below the switching frequency, this will be an indication that the sensor is covered by the container contents, i.e. the contents level in the container is above the monitored level. If on the contrary the evaluating circuit determines that the oscillation frequency of the sensor is above the switching frequency, this will be an indication that the sensor is clear of the container contents, i.e. the contents level in the container is below the monitored level. Sensors of this type are more especially suitable for monitoring the level of liquids, since in such case the change in the natural resonant frequency, which occurs on changing over from the free to the covered state and vice versa, can always be distinctly detected.

Owing to manufacturing conditions such sensors have different resonant frequencies. Since on the other hand in particular in the case of liquids of low density the natural resonant frequencies of the covered and uncovered sensor are relatively close together, the switching frequency for each sensor must be individually set. The evaluating circuit is then necessarily matched with the sensor; if it is to be employed in connection with another sensor, it must be rematched to suit the other sensor, for which purpose the natural resonant frequency of the other sensor must be known. Such matching may not normally be readily performed on the site of application of the equipment. This impairs the performance of repair and servicing operations for the equipment.

An object of the invention is the provision of an apparatus of the type initially mentioned which permits to employ each evaluating circuit with any desired sensor without an individual matching of the evaluating circuit being necessary to suit the respective sensor.

In accordance with the invention this object is attained in that an electrical circuit element is associated with the sensor, which electrical circuit element has a characteristic parameter whose value bears an unambiguous relationship to the natural resonant frequency of the sensor, and that in the evaluating circuit the switching frequency is set in accordance with the value of the characteristic parameter of the electrical circuit element.

During the manufacture of the device in accordance with the invention all evaluating circuits are made identical in design. For each sensor the natural resonant frequency is measured in a free condition and the value of the characteristic parameter of the electrical circuit element is set in accordance with the measured natural resonant frequency. The circuit element is permanently associated with the sensor, for example in a screw-in member of the sensor. The circuit element is so connected with the evaluating circuit that an electrical signal is supplied to the evaluating circuit which indicates the value of the characteristic parameter of the circuit element. Each evaluation circuit comprises a device which sets the respective switching frequency peculiar to the respective sensor in a manner dependent on the value of the characteristic parameter of the circuit element.

It is in this manner that each evaluating circuit can be combined with each sensor without special settings being necessary for matching the evaluating circuit to the sensor. Furthermore one evaluating circuit can be employed in combination with a plurality of sensors, which are interrogated in sequence by the evaluating circuit. In each interrogation the switching frequency in the evaluating circuit is automatically matched to the sensor which is just being interrogated.

Further advantageous developments and modifications of the invention are characterized in the dependent claims.

Various additional features and advantages of the invention will be understood from the following detailed descriptive disclosure of one embodiment thereof in conjunction with the accompanying drawings.

Figure 1:
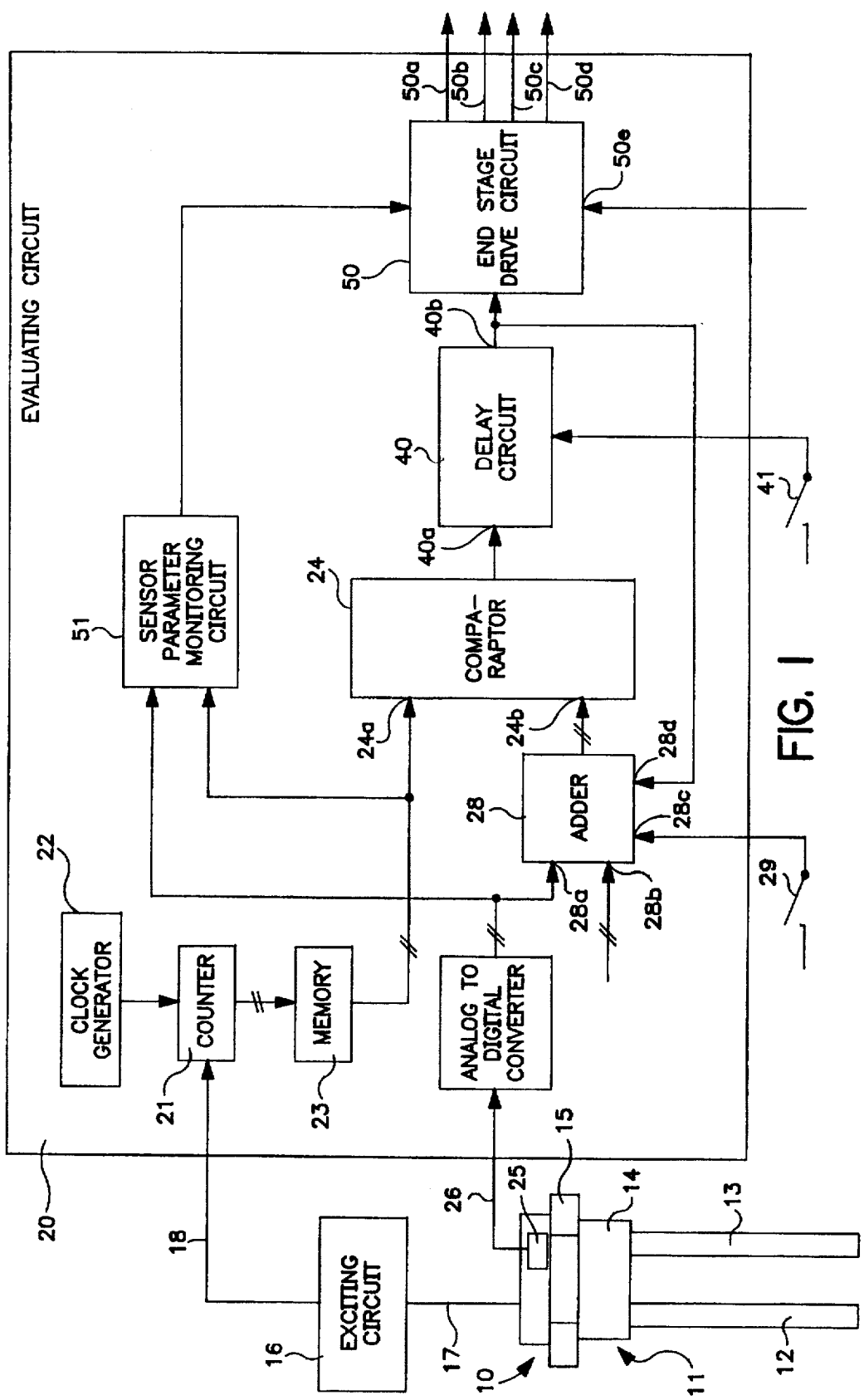
FIG. 1 shows the circuit diagram of a device in accordance with the invention.

The drawing shows a sensor 10 with two parallel oscillating rods 12 and 13 borne by a screw-in member 11. The screw-in member 11 has a screw threaded portion 14 and a hexagonal head 15. The screw threaded portion 14 is so screwed in an opening with a female thread in the wall of a container that the oscillating rods 12 and 13 project into the interior of the container. The hexagonal head 15 permits the use of a spanner to tighten up the screw-in member 11 against the wall of the container. The opening is arranged at such a height on the container wall that the resonant rods 12 and 13 are covered by the contents within the container if the level of the contents exceeds a predetermined height, whereas they will be clear of the contents when the level of the same is below said predetermined height. The position with which the device is mounted is unimportant: the oscillating rods can be vertical if the opening is in the top part of the container wall, or they may be horizontal, if the opening is provided in a lateral wall of the container.

The screw-in member 11 is hollow and in the interior thereof comprises a transducer arrangement, which, when an electrical AC voltage is supplied, causes opposite vibration of the oscillating rods 12 and 13 transversely in relation to the longitudinal axis thereof. The AC voltage is supplied by an exciting circuit 16, which is connected via a line 17 with the transducer arrangement and is so designed that it excites the mechanical oscillating system made up of the resonant rods 12 and 13 and the transducer arrangement to vibrations at the natural resonant frequency thereof. A sensor designed in this manner, in the case of which the transducer arrangement is constituted by piezoelectric elements, is for instance disclosed in the said German patent specification 3,336,991; the transducer arrangement is consequently not described in more detail here.

An output of the exciting circuit 16 is connected by means of a line 18 with an input of an evaluating circuit 20. At this output the exciting circuit provides a signal having the frequency of the oscillations of the sensor 10. This frequency, which in the following will be referred to as the sensor frequency, is in the order of 200 to 500 Hz. The evaluating circuit 20 checks to see whether the sensor frequency is above or below a predetermined switching frequency in order to determine whether the oscillating rods 12 and 13 of the sensor 10 are covered by the contents in the container or not. The natural resonant frequency, at which the oscillating rods 12 and 13 vibrate, is in fact higher, when the oscillating rods oscillate in the air and is lower, when the oscillating rods are immersed in the container contents.

The evaluating circuit 20 includes a counter 21, which at a control input receives a signal supplied by the exciting circuit 16 with the sensor frequency. A clock input of the counter 21 receives clock pulses, which are supplied by a clock generator 22. The frequency of these clock pulses is very high in comparison with the sensor frequency; for instance stance it will be in the order of 500 kHz. The counter 21 is so controlled by the signal applied to its control intput via the line 18 that it counts in each case the clock pulses supplied by the clock generator 22 during a period of this signal. The count achieved at the end of a period is transferred to a memory 23, following which the counter 21 is reset to zero and a new count of the clock pulses during one period of the sensor signal is performed. The digital number held in the counter 23 is hence always proportional to the duration of a period of the sensor signal and consequently is a measure for the sensor frequency.

The digital number available in the memory 23 is supplied to an input 24a of a comparator 24, which at a second input 24b receives a digital number which in like manner indicates the period duration of the switching frequency. At its output the comparator 24 supplies a binary signal, which has one value (for example the signal value of "H"), when the digital number supplied to the input 24a is smaller than the digital number supplied to the input 24b, and which has another signal value (in the given example, the signal value of "L"), when the digital number supplied to the input 24a is larger than the digital number supplied to the input 24b.

Accordingly in the example selected the signal value of "H" of the output signal from the comparator 24 will indicate that the sensor frequency is higher than the switching frequency, and the signal value of "L" will indicate that the sensor frequency is lower than the switching frequency. If the switching frequency is correctly set for the connected sensor 10, the signal value of "H" will hence indicate that the oscillating rods of the sensor 10 are vibrating in air, that is to say the level, which is to be monitored, of the contents has not been attained, whereas the signal value of "L" will indicate that the oscillating rods of the sensor are covered by the contents, i.e. the level to be monitored has been reached or exceeded.

If the switching frequency for a given sensor is permanently set to the correct value, it may be that the evaluating circuit will no longer correctly function, if the sensor is replaced by another one, which owing to conditions of manufacture has a different natural resonant frequency. If for example the natural resonant frequency is so low that it is below the switching frequency, the output signal of the comparator would always indicate the "covered" condition, and if the natural resonant frequency of the sensor is so high that it is above the switching frequency even when the resonant rods are covered, the output signal of the comparator would always indicate the "clear" condition.

In the case of the apparatus illustrated in the drawing there is an automatic matching of the switching frequency to the respectively connected sensor. For this purpose an electrical circuit element 25 is associated with the sensor 10, which electrical circuit element has a characteristic parameter which bears a clear relationship to the natural resonant frequency of the sensor 10. The circuit element 25 is, as indicated symbolically in the drawing, preferably accommodated in the screw-in member 11 of the sensor 10, and it is connected with a second input of the evaluating circuit 20 via a line 26. By way of the line 26 the evaluating circuit 20 receives an electrical signal which indicates the value of the characteristic parameter of the circuit element 25. If this electrical signal in an analog one, it is supplied in the evaluating circuit 20 to an analog to digital converter 27, which converts the analog signal into a digital number, as for example an eight bit number. This digital number is supplied to one input 28a of an adder 28, which at its second input 28b receives a permanently set digital basic number. The adder 28 derives the sum of the numbers supplied to the two inputs and at the output provides a digital number representing such sum, which number is supplied to the second input 24b of the comparator 24 and represents the switching frequency with which the sensor frequency represented by the contents of the memory 23 is compared.

The digital basic number supplied to the input 28b determines the offset between the switching frequency and the natural resonant frequency of the sensor and accordingly the response sensitivity of the apparatus. It is for example so set for water and other liquids of similar density that the switching frequency is 11% below the natural resonant frequency at which the sensor oscillates in the free state. By closing a switch 29 a signal, which changes the number added in the adder 28, may be supplied to a control input 28c of the adder 28. Thereby the offset between the natural resonant frequency of the sensor and the switching frequency is changed in order to match the response sensitivity of the apparatus to container contents with different densities. If, as indicated above, the digital basic number supplied to the input 28b is made of such a size that with the switch 29 open the switching frequency is 11% below the natural resonant frequency of the uncovered sensor, it may happen that when monitoring the level of a liquid with a low density that the vibration frequency of the covered sensor is not reduced by 11% in relation to the vibration frequency of the uncovered sensor. In this case the comparator 24 would not provide any signal which would indicate that the level to be monitored has been reached. By closing the switch 29 in this case the effect is for example that the switching frequency is only 5% below the natural resonant frequency of the uncovered sensor.

Figure 2:
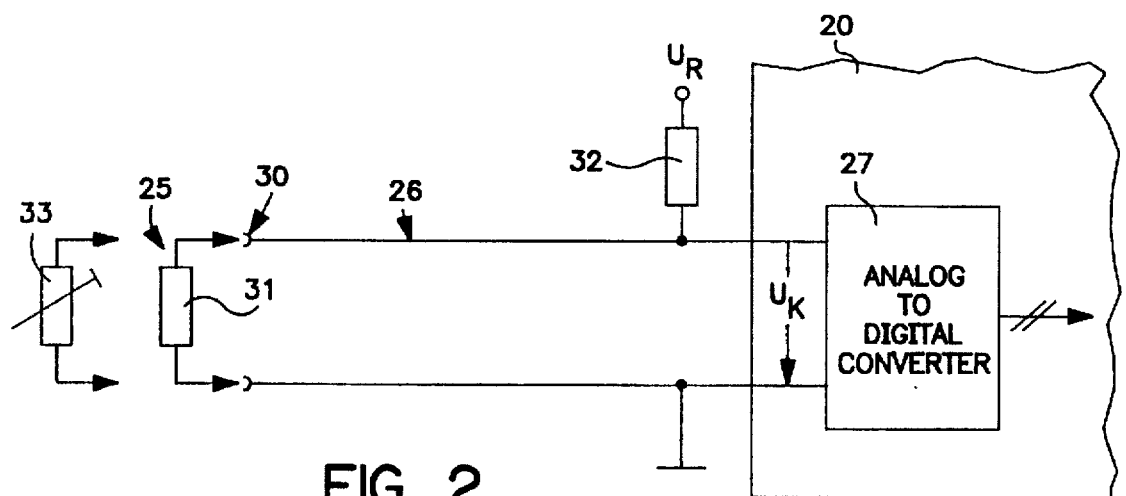
FIGS. 2, 3 and 4 show various different examples of the circuit element associated with the sensor and the connection thereof with the evaluating circuit.
Figure 3:
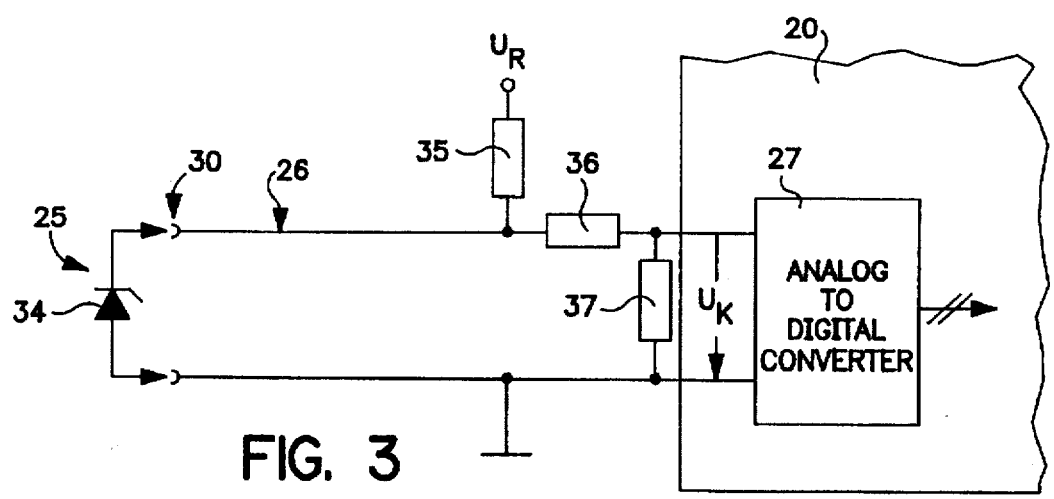
Figure 4:
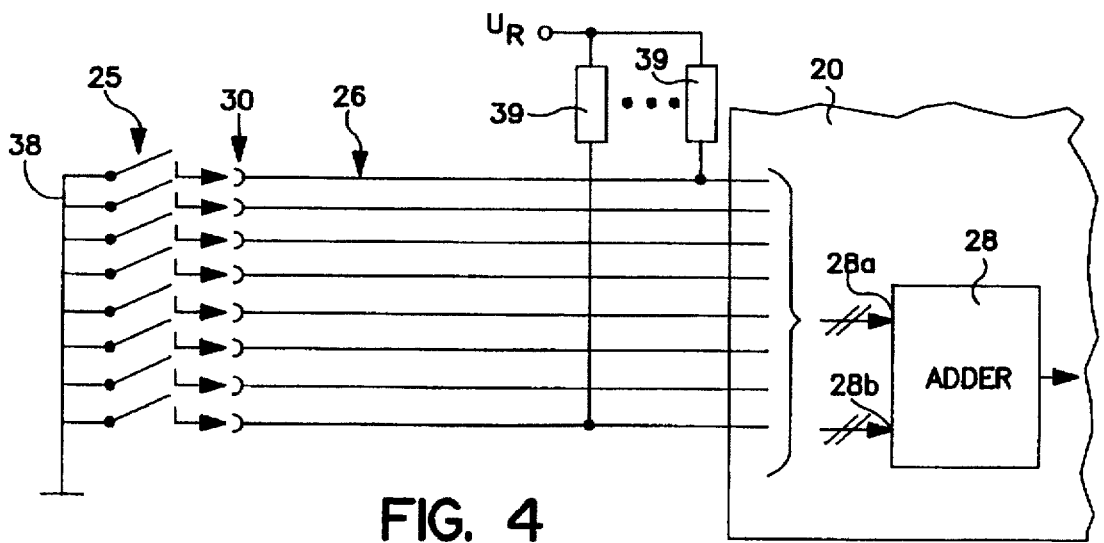

As the electrical circuit element 25, a passive circuit element is preferably employed which does not require any power supply within the sensor. In FIGS. 2, 3 and 4 some examples of suitable circuit elements are illustrated. These figures also each show a part of the evaluating circuit 20 and furthermore the connecting line 26 between the circuit element 25 and the evaluating circuit 20.

Conventionally the evaluating circuit 20 is accommodated together with the exciting circuit 16 in an electronic circuitry enclosure which may be mounted directly on the screw-in member 11 of the sensor 10. When it is mounted, on the one hand the connection between the exciting circuit 16 and the electromechanical transducer arrangement, which is accommodated in the screw-in member 11, and on the other hand the connection between the evaluating circuit 20 and the circuit element 25 are established. This is preferably performed by plug connecting means, which are arranged on the one hand on the screw-in member 11 and on the other hand on the electronic circuitry enclosure. Dependent on the conditions of mounting or of the surroundings it may, however be necessary to arrange the electronic circuitry at a greater distance from the sensor 11; in this case the lines 17 and 26 will have a correspondingly greater length, but in this case as well plug connecting means or similar connecting means are provided, which permit a simple and rapid making and breaking of the connections. In either case there will be the advantage that the electronic circuitry, for example in the case of a failure, can be simply and quickly replaced without the sensor having to be dismounted for this purpose. As connecting means plug connectors 30 are indicated in FIGS. 2 through 4.

FIG. 2 shows a preferred embodiment, in which the electrical circuit element 25 is constituted by a fixed-value resistor 31 and the characteristic parameter, which has an unambiguous relationship to the natural resonant frequency of the sensor, is the resistance value of the fixed-value resistor 31. The line 26 is in this case a two-wire line, of which one wire is connected with ground and the other wire is connected via a drop resistor 32 with a reference voltage $U_R$. The electrical signal, which represents the value of the characteristic parameter, is in this case an analog voltage $U_K$, namely the voltage drop across the fixed-value resistor 31. This analog voltage is supplied inside the evaluating circuit 20 to the analog to digital converter 27 and converted by the same into a digital number in the manner described above.

For the production of each sensor its natural resonant frequency must therefore be measured in a free condition and a fixed-value resistor 31 must be selected with such a resistance value that after the conversion of this resistance value into the analog signal transmitted by the line 26, conversion of the analog signal into a digital number and addition of this digital number to the permanently set basic number a digital number is obtained which expresses the switching frequency in the same fashion as the number stored in the memory 23 represents the sensor frequency after acquisition thereof in the counter 21. Since all such operations are exactly known, the selection of a fixed-value resistor with the correct resistance value will not cause any difficulty for the man in the art. Fixed resistors with a sufficiently fine graduation of the resistance values are commercially available. Preferably metal film resistors will be employed, which are characterized by a high degree of precision and a low thermal coefficient.

FIG. 2 indicates that instead of a fixed-value resistor 32 it is possible as well to employ a variable resistor 33. The variable resistor 33 can be a trimmer resistor, whose resistance value can be set by turning a tap, or a film resistor whose resistance value can be set by working the resistance layer. Such possibilities are familiar to those skilled in the art.

FIG. 3 shows a further example of the electrical circuit element 25 involving the use of a zener diode 34. In this case the characteristic parameter, which bears an unambiguous relationship to the natural resonant frequency of the sensor, is the zener voltage of the zener diode. Zener diodes as well are commercially available with sufficiently fine voltage graduations. The line 26 is, if a zener diode is employed, again a two-wire line whose one wire is connected with ground and whose other wire is connected via a drop resistor 35 with a reference voltage $U_R$. Parallel to the zener diode 34 a voltage divider is placed comprising two resistors 36 and 37. The electrical signal representing the characteristic parameter is again an analog voltage $U_K$, which is supplied to the input of the analog to digital converter 27. This analog voltage $U_K$ corresponds to the zener voltage diminished in accordance with the division ratio of the voltage divider 36–37. The employment of a zener diode instead of a fixed-value resistor leads to the advantage that the analog voltage $U_K$ is independent from fluctuations in the reference voltage $U_R$.

Whereas in the case of the embodiments described so far the electrical signal representing the characteristic parameter is an analog signal, FIG. 4 shows an example for a case in which the electrical signal representing the natural resonant frequency, which is transmitted via the line 26 to the evaluating circuit 20, is a digital signal. The circuit element 25 is in this case a multiple switch 38 with a number of switching contacts corresponding to the bit number of the digital number to be set. In FIG. 4 it is assumed that the switch 38 comprises eight switching contacts, which permits the setting of an eight-digit binary number. Such switches are commercially available in a miniaturized form as so-called dual-in-line switches. In this case the line 26 comprises a separate conductor for each switching contact of the switch 38, i.e. in the example here, eight conductors. Each conductor is connected via a resistor 39 with a reference voltage $U_R$; in FIG. 4 only the resistors 39 of the first and the last conductor are shown for simplification. When the switching contact associated with one conductor is open, the conductor will carry the potential of the reference voltage $U_R$, whereas when the switching contact is closed, the conductor will conduct the ground potential. In this example there is no analog to digital converter 27 in the evaluating circuit 20 and the conductors of the line 26 are directly connected with the inputs 28a of the adder 28, with which in the embodiments of FIGS. 2 and 3 the outputs of the analog to digital converter 27 are connected. The switching contacts of the switch 38 are so set that they represent the natural resonant frequency of the sensor by the same digital number as it is supplied, in the embodiements of FIGS. 2 and 3, by the analog to digital converter 27 due to the conversion of the analog voltage $U_K$. The characteristic parameter of the circuit element 25, which bears an unambiguous relationship to the natural resonant frequency of the sensor, is in this case the setting of the switching contacts of the switch 38.

Each sensor 10 fitted in the manner described with a circuit element 25, may be combined with the same evaluating circuit 20, the switching frequency specific to the sensor being automatically set. Matching of the electronic circuitry by the manufacturer for adaptation to suit a certain sensor is unnecessary.

The output signal of the comparator 24 constitutes a non-delayed sensor condition signal, which indicates whether the sensor is "free" or "covered". This sensor condition signal is supplied to the input 40a of a delay circuit 40, with the output 40b of which an end stage drive circuit 50 is connected. The end stage drive circuit 50 permits the driving of different end stages by the delayed sensor condition signal. For instance one output 50a of the end stage drive circuit 50 may drive an AC end stage, which supplies an AC signal dependent on the sensor condition signal, one output 50b can drive a DC end stage, one output 50c can drive a pulse frequency modulation end stage, and one output 50d can drive a relay end stage, which operates a relay in a fashion dependent on the sensor condition signal. An operational mode control signal, which is supplied to a control output 50e of the end stage drive circuit 50, determines which of the end stages is driven.

The delay of the sensor condition signal in the delay circuit 40 ensures that the end stage drive circuit 50 does not immediately respond to the changes in condition of the sensor condition signal, but rather only when the sensor condition signal has maintained its condition for a certain time. This means that switching or indicating will not be caused by transient disturbances.

By means of a control signal, which is supplied to a control input of the delay circuit 40 via a switch 41, it is possible to switch over the function of the device from the monitoring of a maximum contents level to monitoring a minimum contents level. In the case of monitoring a maximum contents level an indication or a switching operation must be triggered when the previously free sensor gets covered by contents, i.e. when the sensor frequency goes below the switching frequency. On the other hand when monitoring a minimum contents level an indication or a switching operation must be caused when the previously covered sensor is no longer covered, that is to say when the sensor frequency comes to exceed the switching frequency.

Figure 5:
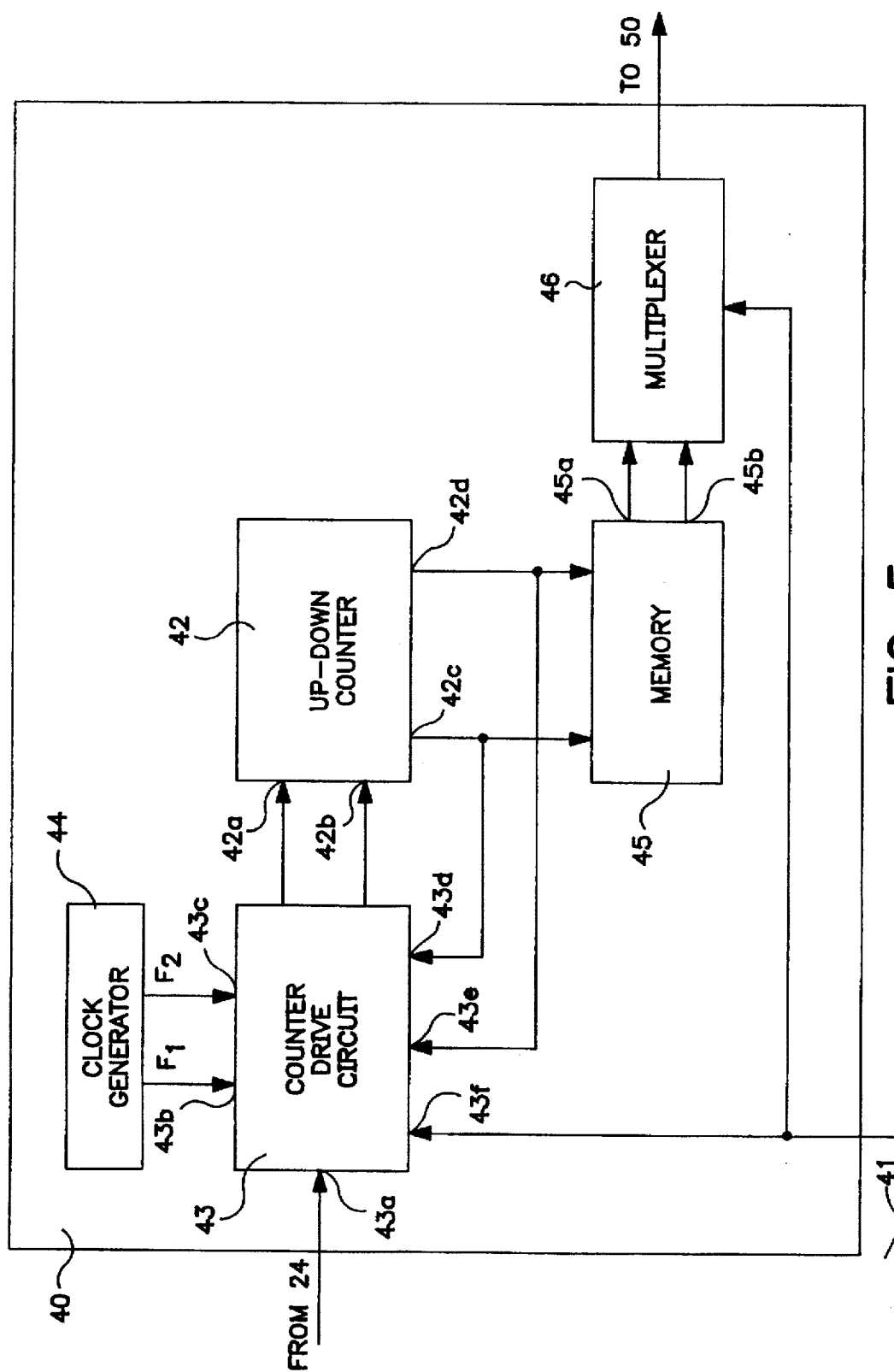
FIG. 5 shows an embodiment of the delay circuit comprised in the evaluating circuit of FIG. 1.

FIG. 5 shows an embodiment of the delay circuit 40 in which the delay is set by an up-down counter 42. This design means that the delay circuit can consist completely of digital circuits, which are compatible with the remaining digital circuits of the evaluating circuit 20. Furthermore with this design it is then possible in a simple manner to obtain an asymmetrical delay, which for example amounts to 1 second, if the sensor condition signal assumes the value corresponding to the "free" condition, and 0.4 seconds, if the sensor condition signal assumes the value which corresponds to the "covered" condition. Such an asymmetrical delay is useful, when the contents are a liquid, on whose surface waves may be produced. If such waves have a period which coincides with a symmetrical delay time, the result may be an instable behavior of the device. Such instability is prevented by an asymmetrical delay.

The undelayed sensor condition signal arriving from the output of the comparator 24 is supplied to one input 43a of a counter drive circuit 43. At two further inputs 43b and 43c the counter drive circuit 43 receives clock pulses, which have two different clock frequencies, from a clock generator 44. For instance the frequency $F_1$ of the clock pulses supplied to the input 43b may be 400 Hz and the frequency $F_2$ of the clock pulses supplied to the input 43c may be 1 kHz so that the two clock frequencies differ by the factor of 2.5. In a fashion dependent on the signal value of the sensor condition signal present at the input 43a the counter drive circuit 43 either transmits the clock pulses with the frequency $F_1$ or the clock pulses with the frequency $F_2$ to an output, which is connected with the clock input 42a of the up-down counter 42. At a second output, which is connected with the count direction control input 42b of the up-down counter 42, the undelayed sensor condition signal will appear. If the sensor condition signal has the high signal value of "H" which corresponds to the "free" condition of the sensor, it will switch the up-down counter 42 over to upward counting and it permits the transmission of the clock pulses with the low clock frequency $F_1$ to the clock input 42a of the up-down counter 42. If on the contrary the sensor condition signal has the low signal value of "L", it will switch the up-down counter 42 over to down counting and it permits the transmission of the clock pulses with the high clock frequency $F_2$ to the clock input 42a of the up-down counter 42.

The up-down counter 42 possesses two outputs 42c and 42d, which are connected with two inputs of a memory 45 and furthermore with two control inputs 43d and 43e of the counter drive circuit 43. At the output 42c the up-down counter 42 supplies a signal when in the course of down counting it reaches a lower limit count $Z_1$, and it supplies a signal at the output 42d when during up counting it reaches an upper limit count $Z_2$. Preferably the lower limit count $Z_1$ is a zero count and the upper limit count $Z_2$ is the maximum count, that is to say for example a count of 4095 in the case of a 12 bit counter.

The memory 45 may assume one or the other of two conditions. The signal supplied by the output 42c of the up-down counter 42 puts the counter 45 in the one condition, for example the condition "0"; the signal supplied by the output 42d of the up-down counter 42 puts the memory 45 into the other condition, that is to say, in the example selected, in the condition "1". At an output 45a the memory 45 supplies a signal whose signal value reflects the condition of the memory, and at an output 45b a signal complementary thereto. The memory 45 may consequently be constituted by a simple flipflop.

The two outputs 45a and 45b of the memory 45 are connected with two inputs of a multiplexer 46. A control input of the multiplexer 46 is connected with the switch 41. Dependent on the setting of the switch 41 the multiplexer 46 will transmit either the signal supplied by the output 45a or the signal supplied by the output 45b to the end stage drive circuit 50; it consequently operates as a simple change-over switch. The switch 41 is furthermore connected with a control input 43f of the counter drive circuit 43.

Figure 6A:
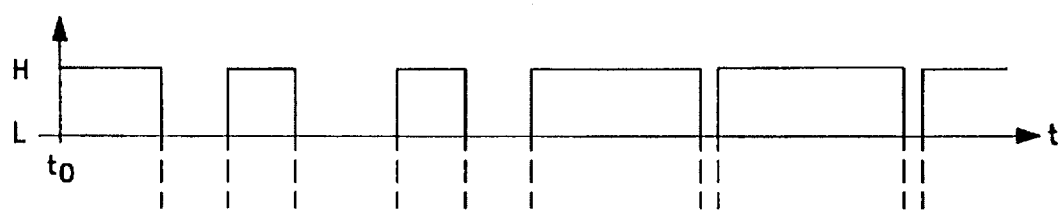
FIG. 6 shows diagrams for explaining the manner of functioning of the delay circuit of FIG. 5.
Figure 6B:
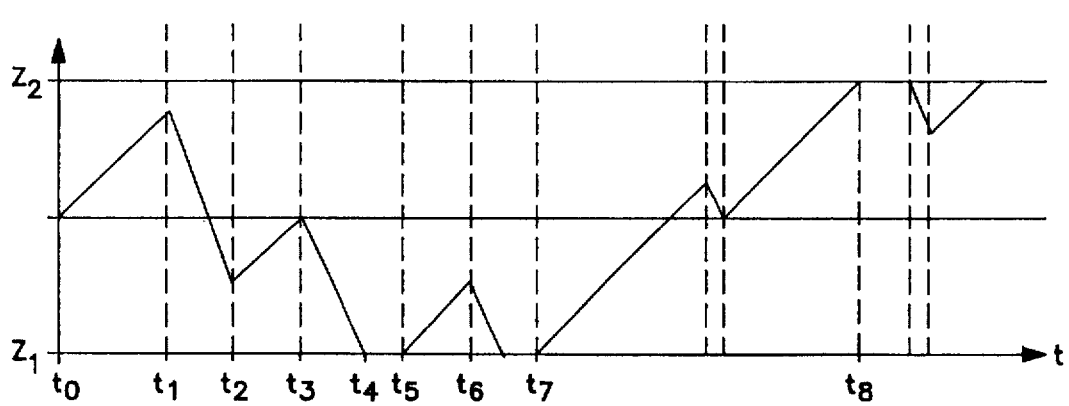
Figure 6C:

The manner of operation of the delay circuit 40 shown in FIG. 5 will be explained with reference to the diagrams in FIG. 6, it firstly being assumed that the switch 41 is open and that the multiplexer 46 in this case transmits the signal from the output 45a to the end stage drive circuit 50. The diagram A in FIG. 6 shows the sensor condition signal coming from the comparator 24, the diagram B shows the change in the count of the up-down counter 42 between the two limit counts $Z_1$ and $Z_2$, and the diagram C shows the output signal of the multiplexer 46, which is supplied to the end stage drive circuit 50.

In diagram A the high signal value "H" denotes the "free" condition and the low signal value "L" indicates the "covered" condition of the sensor. In diagram B it is assumed that the up-down counter 42 has just reached a mid count between the two limit counts $Z_1$ and $Z_2$ at the time $t_0$. Since the sensor condition signal has the signal value "H" at the time $t_0$, the up-down counter 42 will be switched to upward counting so that its count increases at the low clock frequency $F_1$. At the time $t_1$ the sensor condition signal changes from the signal value "H" to the signal value "L", this meaning that counter drive circuit 43 switches the up-down counter 42 over to downward counting and simultaneously supplies the clock pulses with the high clock frequency $F_2$ to the clock input 42a. Accordingly the count of the up-down counter 42 will be diminished at a higher rate than during upward counting. Before the count reaches the lower limit value $Z_1$, at the time $t_2$ the sensor condition signal will return to the signal value "H" so that between the times $t_2$ and $t_3$ there will again be upward counting at the low clock frequency $F_1$. At the time $t_3$ downward counting at the clock frequency $F_2$ will be recommenced, in the course of which the lower limit count $Z_1$ will be reached at the time $t_4$.

On reaching the lower limit count $Z_1$ at the time $t_4$, the up-down counter 42 will supply at its output 42c a signal, which is supplied to the memory 45. If the memory 45 had already reached the condition "0" before the time $t_4$, as is indicated in the diagram C of figure in a continuous line, this condition will continue to exist. If on the contrary the memory 45 had reached the condition "1" before the time $t_4$, as shown in broken lines in diagram C, the memory 45 will change over from the condition "1" to the condition "0" and accordingly there will also be a change in the signal at the output 45a, which is transmitted from the multiplexer 46 to the end stage drive circuit 50. Therefore there will be an indication that the sensor is now covered by the contents.

The signal supplied by the up-down counter 42 at the output 42c is also supplied to the control input 43d of the counter drive circuit 43. It prevents count pulses being supplied by the counter drive circuit 43 to the up-down counter 42 which would occasion further down counting. The up-down counter 42 consequently remains at the same count until at the time $t_5$ upward counting is restarted. If after this upward counting and subsequent downward counting the lower limit count is reached at the time $t_6$, the up-down counter 42 will again supply a signal at the output 42c, which however will not have any effect on the condition of the memory 45, since the same was already previously in the condition "0". On the other hand this signal will, acting via the counter drive circuit 43, again prevent further downward counting in the up-down counter 42 until at the time $t_7$ upward counting is recommenced.

The diagram B of FIG. 6 indicates that owing to the up counting started at the time $t_7$, with a short interruption due to down counting, finally at the time $t_8$ the upper limit count $Z_2$ will be reached. At the time $t_8$ the up-down counter 42 hence supplies a signal at the output 42d to switch over the memory 45 into the "1" condition. Accordingly the output signal present at the output 45a, which is transmitted by the multiplexer 56 to the end stage drive circuit 50, also changes in order to indicate that the sensor is freely oscillating again, i.e. it is no longer covered by the contents of the container. This signal is also supplied to the control input 43e of the counter drive circuit 43 in order to prevent further upward counting in the up-down counter 42 until downward counting is recommenced.

When the switch 41 is closed the signal supplied to the counter drive circuit effects a reversal of the action of the sensor condition signal on the count direction of the up-down counter 42: the up-down counter 42 makes an upward count if the sensor condition signal has the signal value of "L" and it counts downward, if the sensor condition signal has the signal value of "H". In the multiplexer 46 the closing of the switch 41 has the effect that instead of the signal present at the output 45a of the memory 45 the complementary signal, which is present at the output 45b, is transmitted to the end stage drive circuit 50.

From the diagrams of FIG. 6 it can be recognized that a change in the sensor condition signal is not immediately transmitted to the end stage drive circuit 50, but rather with a delay, which is at least equal to the time taken to pass through the count range between the two limit counts $Z_1$ and $Z_2$ at the clock frequency effective in the respective count direction, possibly extended by intermediate changes in the count direction. It is in this manner that transient changes in the sensor condition signal are suppressed and lasting changes are only indicated when they have been confirmed for a certain period of time.

If the sensor 10 is partly covered by the contents placed in the container, its natural resonant frequency may assume a value which is very close to the switching frequency, this possibly meaning that at a substantially constant level of the contents the switching frequency will be frequently exceeded and gone below. In order to provide an unambiguous indication of the level of the contents in this case, the delayed sensor condition signal supplied by the delay circuit 40 is also supplied to a control input 28d of the adder 28. Its effect, dependent on its signal value, is that of the addition or, respectively, subtraction, of an additional digital number such that the digital number representing the switching frequency is altered to achieve a switching hysteresis action.

Finally the evaluating circuit 20 comprises a sensor parameter monitoring circuit 51, which on the one hand receives the digital number supplied by the memory 23 and which indicates the sensor frequency, and on the other hand the digital number supplied by the analog to digital converter 27. On the basis of these numbers the sensor parameter monitoring circuit 51 monitors the sensor oscillation range and the range of the characteristic parameter and furthermore the lines between the sensor and the evaluating circuit. If one of the digital numbers lies outside a predetermined range or if the absence of one of these numbers indicates an interruption in a line, the sensor parameter monitoring circuit will send an alarm signal to the end stage drive circuit, and such signal will be passed by it on to the selected end stage where it indicates that there is a fault state.

A substantial advantage of the evaluating circuit 20 is that it exclusively consists of digital circuits. It may consequently be produced as an integrated circuit.

What is claimed is:

1. A device for monitoring a predetermined level of contents in a container, comprising a sensor which is so arranged on the container relative to the contents to be monitored that it comes into contact with the contents when the same reaches the predetermined level, an exciting arrangement which excites the sensor to mechanical vibrations at its natural resonant frequency, an electrical circuit element associated with the sensor, the electrical circuit element has a characteristic parameter having a constant value which bears an unambiguous relationship to the natural resonant frequency of the sensor when oscillating in air, and an evaluating circuit for causing at least one of display and switching operations dependent on whether the frequency of the mechanical vibrations of the sensor is above or below a switching frequency, the evaluating circuit including a first converting arrangement which converts the frequency of the mechanical vibrations of the sensor into a first digital number, a second converting arrangement which converts the constant value of the characteristic parameter of the circuit element into a second digital number, an adding circuit which by addition of a fixed basic number to the second digital number forms a summated digital number which indicates the switching frequency, and a comparator which at a first input receives the first digital number, at a second input receives the summated digital number, and at its output supplies an undelayed sensor condition signal which in accordance with the result of the comparison between the first digital number and the summated digital number assumes at least one of two signal values.

2. The device as claimed in claim 1, wherein a delay circuit is connected with the output of the comparator and imparts a predetermined delay to the undelayed sensor condition signal supplied by the comparator and supplies a delayed sensor condition signal, which is employed for triggering at least one of the display and switching operations.

3. The device as claimed in claim 2, wherein the delay imparted by the delay circuit is of different magnitude depending upon the signal value of undelayed sensor condition signal.

4. The device as claimed in claim 3, wherein the delay circuit comprises an up-down counter, whose direction of count is controlled by the undelayed sensor signal and which in a manner dependent of the direction of count is operated with different clock frequencies.

5. The device as claimed in claim 1, wherein the evaluating circuit comprises a sensor parameter monitoring circuit, which receives the first and the second digital numbers and supplies an alarm signal when one of the digital numbers is outside a predetermined range.

* * * * *